(12) United States Patent
Konishi (10) Patent No.: US 11,523,011 B2
(45) Date of Patent: Dec. 6, 2022

(54) IMAGE FORMING APPARATUS AND NUMERICAL VALUE COUNTING METHOD

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/288,111

(22) PCT Filed: Nov. 5, 2019

(86) PCT No.: PCT/JP2019/043209
§ 371 (c)(1),
(2) Date: Apr. 23, 2021

(87) PCT Pub. No.: WO2020/095876
PCT Pub. Date: May 14, 2020

(65) Prior Publication Data
US 2021/0377401 A1      Dec. 2, 2021

(30) Foreign Application Priority Data

Nov. 5, 2018    (JP) .............................. JP2018-207891

(51) Int. Cl.
| | | |
|---|---|---|
| *H04N 1/00* | (2006.01) | |
| *G06F 3/041* | (2006.01) | |
| *G06F 3/0488* | (2022.01) | |

(52) U.S. Cl.
CPC ....... *H04N 1/00411* (2013.01); *G06F 3/0412* (2013.01); *G06F 3/0488* (2013.01)

(58) Field of Classification Search
CPC .. H04N 1/00411; G06F 3/0412; G06F 3/0488
(Continued)

(56) References Cited

U.S. PATENT DOCUMENTS

2010/0235794 A1* 9/2010 Ording ................. G06F 3/0488
                                                         715/863
2013/0036382 A1* 2/2013 Yuan ..................... G06F 3/0484
                                                         715/815
(Continued)

FOREIGN PATENT DOCUMENTS

JP    2006243989 A    9/2006
JP    2007116336 A    5/2007
(Continued)

OTHER PUBLICATIONS

European Patent Office, Extended European Search Report Issued in Application No. 19882903.8, dated Dec. 2, 2021, Germany, 11 pages.

(Continued)

*Primary Examiner* — Sherrod L Keaton
(74) *Attorney, Agent, or Firm* — Alleman Hall Creasman & Tuttle LLP (57) ABSTRACT

To provide an image forming apparatus having an excellent operability for inputting a numerical value, an image forming apparatus (1) includes a touch panel (20), an angle change calculating portion (100), and a numerical value counting portion (130). The touch panel (20) is configured to detect touches of a plurality of fingers. The angle change calculating portion (100) is configured to, when it is detected that a first finger and a second finger have been touched to the touch panel (20), calculate an angle change of the second finger with the first finger as a fulcrum. The numerical value counting portion (130) is configured to count a numerical value that is input, in response to the angle change calculated by the angle change calculating portion (100).

6 Claims, 7 Drawing Sheets

(58) Field of Classification Search
USPC .......................................................... 715/771
See application file for complete search history.

(56) References Cited

U.S. PATENT DOCUMENTS

| | | | | |
|---|---|---|---|---|
| 2015/0036159 A1* | 2/2015 | Nakatsu | ............. | H04N 1/00411 358/1.13 |
| 2015/0363082 A1* | 12/2015 | Zhao | ................... | G06F 3/04883 715/800 |
| 2016/0156793 A1* | 6/2016 | Okabayashi | ........ | G06F 3/04847 358/1.15 |

FOREIGN PATENT DOCUMENTS

| | | | |
|---|---|---|---|
| JP | 2012208684 A | 10/2012 | |
| JP | 2013008326 A | 1/2013 | |
| JP | 2017091556 A | 5/2017 | |

OTHER PUBLICATIONS

Japan Patent Office, Office Action Issued in Application No. 2020556061, dated Apr. 5, 2022, 3 pages.

\* cited by examiner

IMAGE FORMING APPARATUS AND NUMERICAL VALUE COUNTING METHOD

TECHNICAL FIELD

The present invention relates to an image forming apparatus for inputting a numerical value via a GUI and a numerical value counting method.

BACKGROUND ART

There is known an image forming apparatus such as a MFP (Multifunctional Peripheral) that is capable of printing a document or an image.

On the other hand, PTL (patent literature) 1 discloses an information processing apparatus including a touch panel, wherein when a user performs touch operations onto the touch panel with a plurality of fingers, the apparatus detects the number of touch operations performed, and identifies a digit in an amount of page feeding. The information processing apparatus counts up the identified digit while the user performs the touch operations. In this way, the apparatus displays, on a display portion, the pages of an electronic document moving, identifies a page that the user wants to display from the touch operations performed by the user, and displays the identified page.

CITATION LIST

Patent Literature

[PTL 1] Japanese Patent Application Publication No. 2017-91556

SUMMARY OF THE INVENTION

Problems to be Solved by the Invention

However, although PTL 1 discloses a technique for page moving, it does not disclose a technique for counting and inputting a numerical value in a numerical value input field of the GUI with an intuitive operation.

The present invention has been made in view of such conventional circumstances, and it is an object of the present invention to provide an image forming apparatus that can count and input a numerical value with an intuitive operation.

Solution to the Problems

An image forming apparatus according to an aspect of the present invention includes a touch panel, an angle change calculating portion, and a numerical value counting portion. The touch panel is configured to detect touches of a plurality of fingers. The angle change calculating portion is configured to, when it is detected that a first finger and a second finger have been touched to the touch panel, calculate an angle change of the second finger with the first finger as a fulcrum. The numerical value counting portion is configured to count a numerical value that is input, in response to the angle change calculated by the angle change calculating portion.

A numerical value counting method according to another aspect of the present invention is a numerical value counting method executed by an image forming apparatus, and the numerical value counting method causes the image forming apparatus to: detect touches of a plurality of fingers; when it is detected that a first finger and a second finger have been touched to the touch panel, calculate an angle change of the second finger with the first finger as a fulcrum; and count a numerical value that is input, in response to the calculated angle change.

Advantageous Effects of the Invention

According to the present invention, it is possible to provide an image forming apparatus that can count and input a numerical value with an intuitive operation.

DESCRIPTION OF EMBODIMENTS

Embodiment

[System Configuration of Image Forming Apparatus 1]

Figure 1:
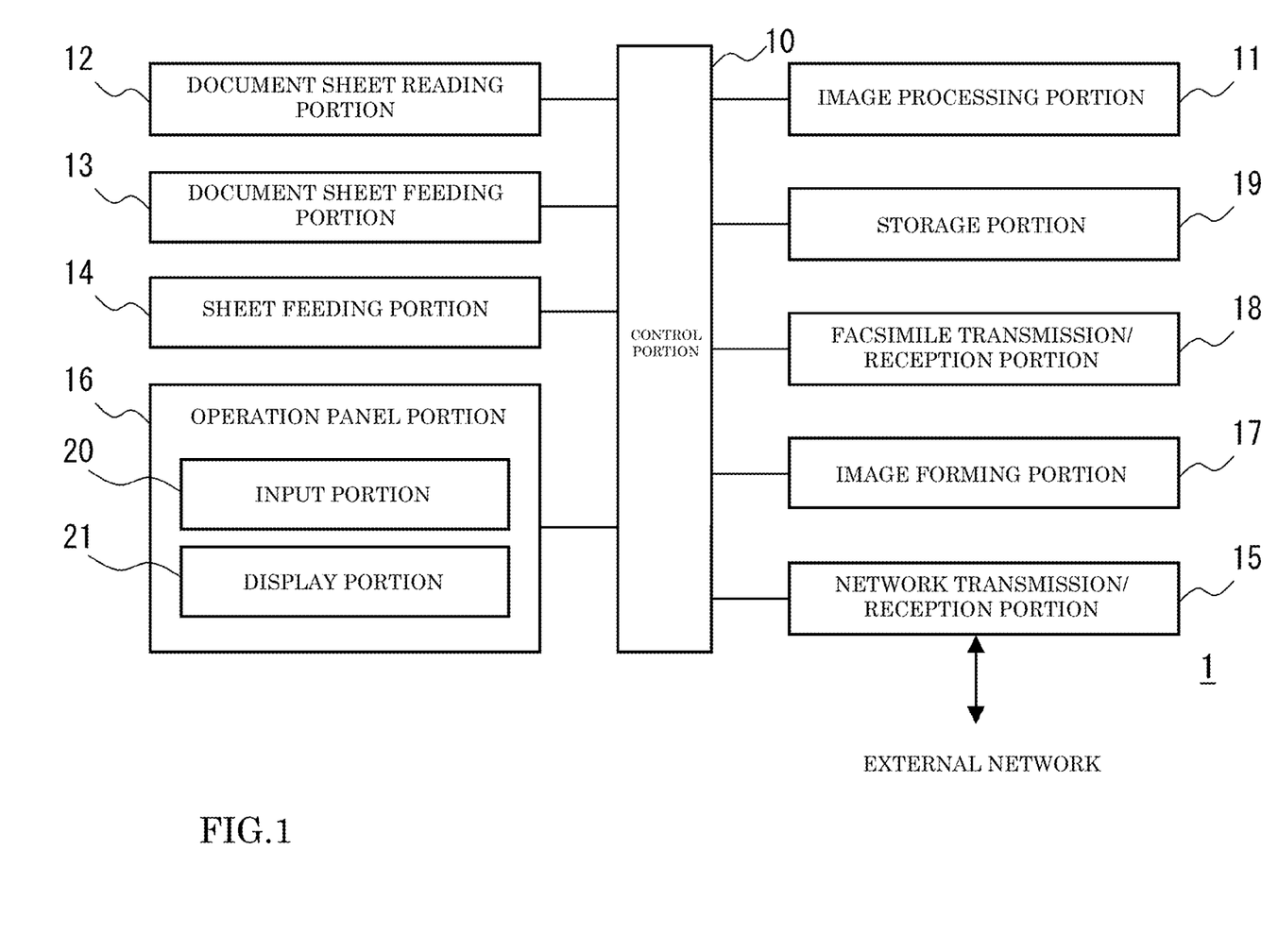
FIG. 1 is a system configuration diagram of an image forming apparatus according to an embodiment of the present invention.

First, a system configuration of an image forming apparatus 1 is described with reference to FIG. 1.

The image forming apparatus 1 includes an image processing portion 11, a document sheet reading portion 12, a document sheet feeding portion 13, a sheet feeding portion 14, a network transmission/reception portion 15, an operation panel portion 16, an image forming portion 17 (image forming means), a facsimile transmission/reception portion 18, and a storage portion 19. These portions are connected to a control portion 10, and operations thereof are controlled by the control portion 10.

The control portion 10 is an information processing portion such as a GPP (General Purpose Processor), a CPU (Central Processing Unit), a MPU (Micro Processing Unit), a DSP (Digital Signal Processor), a GPU (Graphics Processing Unit), or an ASIC (Application Specific Processor).

The control portion 10 operates as portions of function blocks described below by reading control programs stored in a ROM or a HDD of the storage portion 19 and expanding them on a RAM and executing them. In addition, the control portion 10 controls the whole apparatus in response to predetermined instruction information that is input from an external terminal (not shown) or the operation panel portion 16.

The image processing portion 11 is control computing means such as a DSP (Digital Signal Processor) or a GPU (Graphics Processing Unit). The image processing portion 11 performs predetermined image processing on image data. The predetermined image processing may be, for example, magnification/reduction, density adjustment, or image improvement.

In addition, the image processing portion 11 stores, in the storage portion 19 as print data, the image read by the document sheet reading portion 12. In this case, the image processing portion 11 may convert the print data to an electronic document file such as a PDF file or an image data file such as a TIFF file. In addition, the image processing portion 11 may be able to execute at least a partial process of OCR (Optical Character Recognition).

The document sheet reading portion 12 reads a document sheet that has been set. In addition, the document sheet reading portion 12 is installed on an upper part of a main body portion of the image forming apparatus 1.

The document sheet reading portion 12 includes a scanner, a platen glass, and a document sheet read slit. In a case of reading a document sheet placed on the platen glass, the document sheet reading portion 12 moves the scanner to a position facing the platen glass, acquires image data by scanning and reading the document sheet placed on the platen glass, and outputs the acquired image data to the control portion 10.

In addition, in a case of reading a document sheet fed from the document sheet feeding portion 13, the document sheet reading portion 12 moves the scanner to a position facing the document sheet read slit. Subsequently, the document sheet reading portion 12 reads the document sheet via the document sheet read slit in synchronization with the operation of the document sheet feeding portion 13 conveying the document sheet. The document sheet reading portion 12 outputs the acquired image data to the control portion 10.

The document sheet feeding portion 13 conveys the document sheet that is read by the document sheet reading portion 12. The document sheet feeding portion 13 is installed on an upper part of the document sheet reading portion 12.

The document sheet feeding portion 13 includes a document sheet placement portion and a document sheet conveyance mechanism. The document sheet feeding portion 13 picks up and feeds document sheets placed on the document sheet placement portion one by one to the document sheet reading portion 12.

The sheet feeding portion 14 feeds recording sheets one by one toward the image forming portion 17. The sheet feeding portion 14 is provided in the main body portion.

The network transmission/reception portion 15 is a network connection portion including: a LAN board for connecting to an external network such as a LAN, a wireless LAN, a WAN, or a mobile telephone network; and a wireless transmitter/receiver.

The network transmission/reception portion 15 transmits and receives data via a data communication line, and transmits and receives a voice signal via a voice telephone line.

The operation panel portion 16 is a means for acquiring a user instruction and displaying a state of the image forming apparatus 1 or the like. That is, the operation panel portion 16 is an interface between the image forming apparatus 1 and the user.

The configuration of the operation panel portion 16 is described below.

The image forming portion 17, in response to an output instruction from the user, performs a process of forming an image on a recording sheet from the data stored in the storage portion 19, the data read by the document sheet reading portion 12, or the data acquired from an external terminal.

The image forming portion 17 includes a photoconductor drum, an exposure portion, a developing portion, a transfer portion, and a fixing portion. The image forming portion 17 records a toner image on a recording sheet by executing an image formation process composed of electric charging, exposure, developing, transfer, and fixing.

The facsimile transmission/reception portion 18 performs facsimile transmission and reception. The facsimile transmission/reception portion 18 is configured to receive a facsimile from another facsimile device (not shown) via a voice line, store the facsimile in the storage portion 19, and cause the image forming portion 17 to form an image from the facsimile. In addition, the facsimile transmission/reception portion 18 is configured to convert the data of a document sheet read by the document sheet reading portion 12 or the data of a network facsimile transmitted from an external terminal to image data, and transmits a facsimile of the image data to another facsimile device via the voice line.

The storage portion 19 is a non-transitory recording medium such as: a semiconductor memory such as a ROM (Read Only Memory) or a RAM (Random Access Memory); or a HDD (Hard Disk Drive).

Control programs for controlling the operation of the image forming apparatus 1 are stored in the ROM or the HDD of the storage portion 19. In addition, the storage portion 19 stores the account setting of the user. In addition, the storage portion 19 may include a region of storage folders (document boxes) for each user.

Furthermore, the operation panel portion 16 includes an input portion 20 and a display portion 21.

The input portion 20 includes a touch panel and switches (buttons) for acquiring various types of instructions from the user.

In the present embodiment, for example, the touch panel is an electrostatic capacitance type, a resistance film type, or an optical type and supports multi-touch, and the input portion 20 is configured to detect a plurality of positions at which a plurality of fingers have been pressed respectively.

The switches acquire, for example, instructions concerning a start key, numeral keys, switching between operation modes, and printing, transmitting, and receiving a selected document sheet. The operation modes include, for example, "copy", "scan", "store document box", and "transmit facsimile".

The display portion 21 is, for example: a flat display panel such as a LCD (Liquid Crystal Display), an OEL (Organic Electro-Luminescence) display, or a FED (Field Emission Display); a projector; or a status indicator LED.

The display portion 21, as a display field corresponding to a GUI (Graphical User Interface), displays various operation screens, icons, characters, images and the like. Specifically, the display portion 21 displays statuses of the image forming apparatus 1, various set values and the like.

In the present embodiment, for example, the touch panel of the input portion 20 is integrally provided with the display portion 21. As a result, the user can make an instruction by touching on the GUI display field of the display portion 21.

In addition, the operation panel portion 16 may include, for example: a memory card reader for connecting to an external recording medium such as a flash memory card; or a card reader for reading a magnetic card or an IC card for authentication.

It is noted that in the image forming apparatus 1, the control portion 10 and the image processing portion 11 may be integrally formed with each other as in a GPU-integrated CPU, a chip-on-module package, a SOC (System On a Chip).

In addition, the control portion 10 and the image processing portion 11 may include a RAM, a ROM, a flash memory or the like.

[Functional Configuration of Image Forming Apparatus 1]

Figure 2:
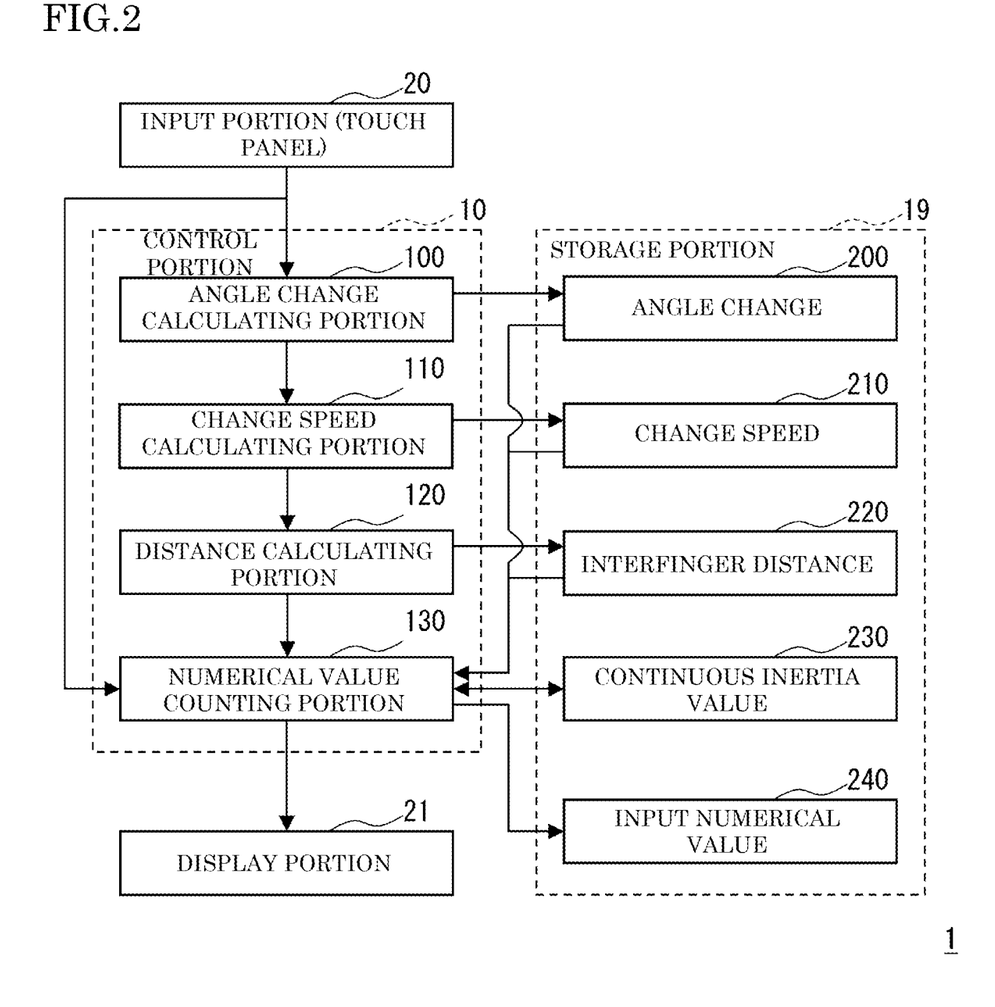
FIG. 2 is a block diagram showing a functional configuration of the image forming apparatus according to an embodiment of the present invention.

Here, a functional configuration of the image forming apparatus 1 is described with reference to FIG. 2.

In the present embodiment, the touch panel of the input portion 20 is configured to detect touches of a plurality of fingers.

The control portion 10 of the image forming apparatus 1 includes an angle change calculating portion 100, a change speed calculating portion 110, a distance calculating portion 120, and a numerical value counting portion 130.

The storage portion 19 stores an angle change 200, a change speed 210, an interfinger distance 220, a continuous inertia value 230, and an input numerical value 240.

In a case where it is detected that a first finger and a second finger have been touched to the touch panel, the angle change calculating portion 100 calculates the angle change 200 of the second finger with the first finger as a fulcrum (base point), and stores the angle change 200 in the storage portion 19. Specifically, for example, the angle change calculating portion 100 calculates, as the angle change 200, an angle of a rotation corresponding to the first finger.

The change speed calculating portion 110 calculates the change speed 210 of the angle change 200. Specifically, for example, while the first finger and the second finger are touched, the change speed calculating portion 110 calculates an angular velocity of the angle change 200 at predetermined time intervals, and stores and updates the angular velocity in the storage portion 19 as the change speed 210.

The distance calculating portion 120 calculates the interfinger distance 220 between the first finger and the second finger, and stores the interfinger distance 220 in the storage portion 19. In this case, the distance calculating portion 120 also calculates the change of the interfinger distance 220 and is configured to detect what is called a pinch-in and a pinch-out.

The numerical value counting portion 130 make a count to increase or decrease the input numerical value 240 of a numerical value input field 300 in response to the angle change 200 calculated by the angle change calculating portion 100. As the count, the numerical value counting portion 130 perform a count-up to increase the input numerical value 240 or a count-down to decrease the input numerical value 240.

Furthermore, during the count, the numerical value counting portion 130 also changes the count width of the change of the input numerical value 240 in response to the change speed 210 calculated by the change speed calculating portion 110. Furthermore, in the present embodiment, in a case where the count width is large, for example, in a case where the speed is faster than a predetermined threshold, the numerical value counting portion 130 continues the count even if the second finger is separated from the touch panel. That is, the count is continued as if the "inertia" is applied. In a case where the count is continued by the "inertia", namely, in a case where the count is continued even when the second finger is separated from the touch panel, the numerical value counting portion 130 gradually slows down the count and/or stops the count when a touch on the touch panel is detected again.

In addition, the numerical value counting portion 130 is configured to change a digit to be counted, in correspondence with the number of fingers touched on the touch panel. In the present embodiment, in a case where fingers were touched in order from the first finger to the second finger, the numerical value counting portion 130 counts an integer digit of the input numerical value 240, and in a case where fingers were touched in order from the second finger to the first finger, the numerical value counting portion 130 counts a decimal digit of the input numerical value 240. The numerical value counting portion 130 may change a digit to be counted, in correspondence with moving up and down of the first finger and the second finger. In addition, the numerical value counting portion 130 may change a digit to be counted, in correspondence with the interfinger distance 220 calculated by the distance calculating portion 120.

The angle change 200 is a value that indicates an angle change when the second finger is rotated with the first finger as the fulcrum. For example, the angle change 200 may be set in units of radians or degrees.

The change speed 210 is a value that indicates a speed of the change of the angle change 200. For example, the change speed 210 may be set in units of several milliseconds, in units of frames, or in units of angle velocity indicating the change by radians or degrees.

The interfinger distance 220 is a distance between the touched first finger and second finger. For example, the distance may be a distance on the coordinates on the touch panel. In addition, the interfinger distance 220 may include a value that indicates a change in the distance.

The continuous inertia value 230 is a value that indicates the count speed for continuing the count even when the second finger is separated from the touch panel. This may be set as a value that corresponds to a counter (timer) until the count is continued by the "inertia".

The input numerical value 240 is a value that is input in the numerical value input field 300. The value may include an integer, a decimal or the like.

Here, the control portion 10 of the image forming apparatus 1 is caused to function as the angle change calculating portion 100, the change speed calculating portion 110, the distance calculating portion 120, and the numerical value counting portion 130 when it executes the control programs stored in the storage portion 19.

In addition, the above-described portions of the image forming apparatus 1 become hardware resources that execute a numerical value counting method of the present invention.

It is noted that a part of or an arbitrary combination of the above-described functional configurations may be configured as hardware by, for example, an IC, a programable logic, or a FPGA (Field-Programmable Gate Array).

[Numerical Value Counting Process by Image Forming Apparatus 1]

Next, a numerical value counting process by the image forming apparatus 1 according to the embodiment of the present invention is described with reference to FIG. 3 to FIG. 7.

Figure 3:
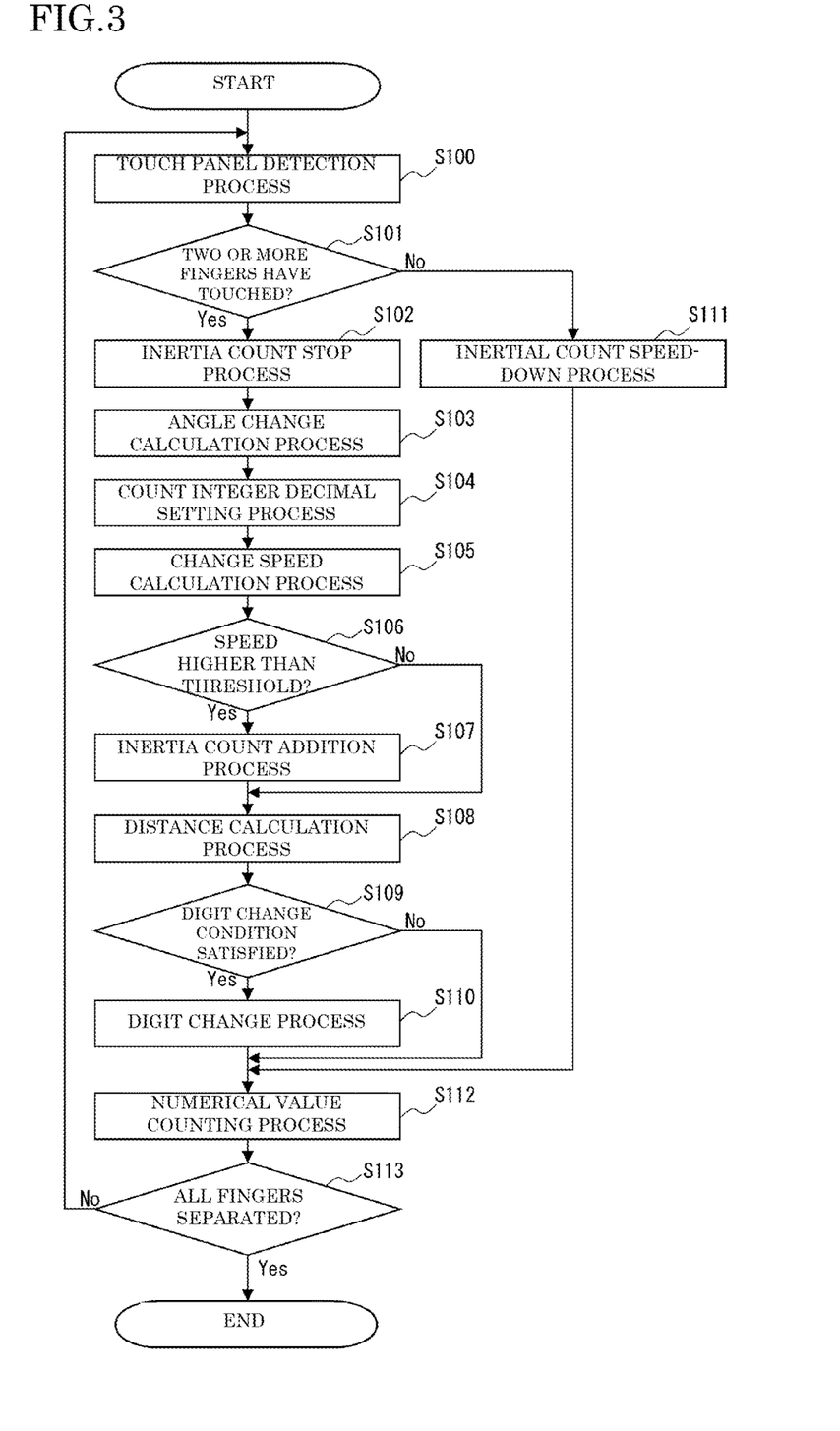
FIG. 3 is a flowchart of a numerical value counting process according to an embodiment of the present invention.

In the numerical value counting process of the present embodiment, a gesture operation "rotation" is performed to input a numerical value. Specifically, first, a touch of a plurality of fingers is detected. Subsequently, in a case where a touch of the first finger and the second finger has been detected, a change of the angle of the second finger with the first finger as the fulcrum is calculated. A numerical value is counted in response to the change of the angle.

The present embodiment describes with an example in which with regard to a hand of a user touched on the touch panel of the input portion 20, the fingertips are located at an upper side and the wrist is located at a lower side, the first finger is the thumb, the second finger is the index finger, the third finger is the middle finger, the fourth finger is the ring finger, and the fifth finger is the little finger.

In the numerical value counting process of the present embodiment, mainly the control portion 10 executes the programs stored in the storage portion 19 in corporation with the other portions using hardware resources.

The following describes the numerical value counting process of the present embodiment in detail step by step with reference to the flowchart of FIG. 3.

(Step S100)

First, the angle change calculating portion 100 performs a touch panel detection process.

When a numerical value has been input to the numerical value input field 300, the angle change calculating portion 100 detects a pressing of the touch panel of the input portion 20, and acquires coordinates corresponding to touches of fingers. When multiple touches are detected, multiple coordinates are acquired.

Figure 4:
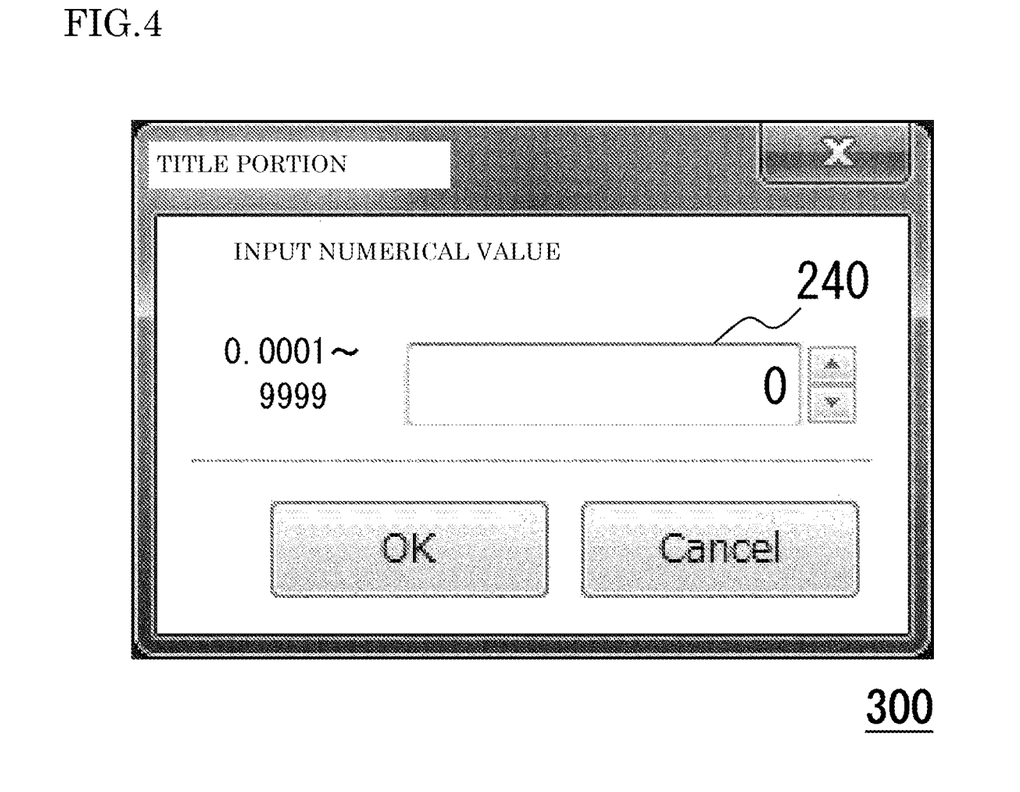
FIG. 4 is a conceptual diagram of a numerical value input field used in the numerical value counting process shown in FIG. 3.

FIG. 4 shows an example of the numerical value input field 300 that is displayed as a dialog box of GUI on the display portion 21 of the operation panel portion 16. The input numerical value 240 in the numerical value input field 300 is counted in response to a gesture operation by touching.

(Step S101)

Subsequently, the numerical value counting portion 130 determines whether or not two or more fingers have touched. When the touch panel of the input portion 20 has been touched at two or more points, the numerical value counting portion 130 determines as Yes. Otherwise, the numerical value counting portion 130 determines as No. Upon determining as Yes, the numerical value counting portion 130 moves the process to step S102. Upon determining as No, the numerical value counting portion 130 moves the process to step S111.

(Step S102)

Upon determining that two or more fingers have touched, the numerical value counting portion 130 performs an inertia count stop process. The numerical value counting portion 130 sets an inertial continuing value to zero. This makes it possible to, in a case where the count had been continued by "inertia" even after the second finger had been separated as described below, stop a count upon detection of a touch on the touch panel again. That is, in a state where a count is continued, the count is stopped when a finger is touched on the touch panel again.

(Step S103)

Subsequently, the angle change calculating portion 100 performs an angle change calculation process.

In a case where it has been detected that the first finger and the second finger were touched to the touch panel, the angle change calculating portion 100 calculates the angle change 200 of the second finger with the first finger as the fulcrum. That is, the angle change calculating portion 100 detects a gesture of rotation by the touch of the two fingers (hereinafter referred to as a gesture operation "rotation"), and calculates an angle of the rotation.

Figure 5A:
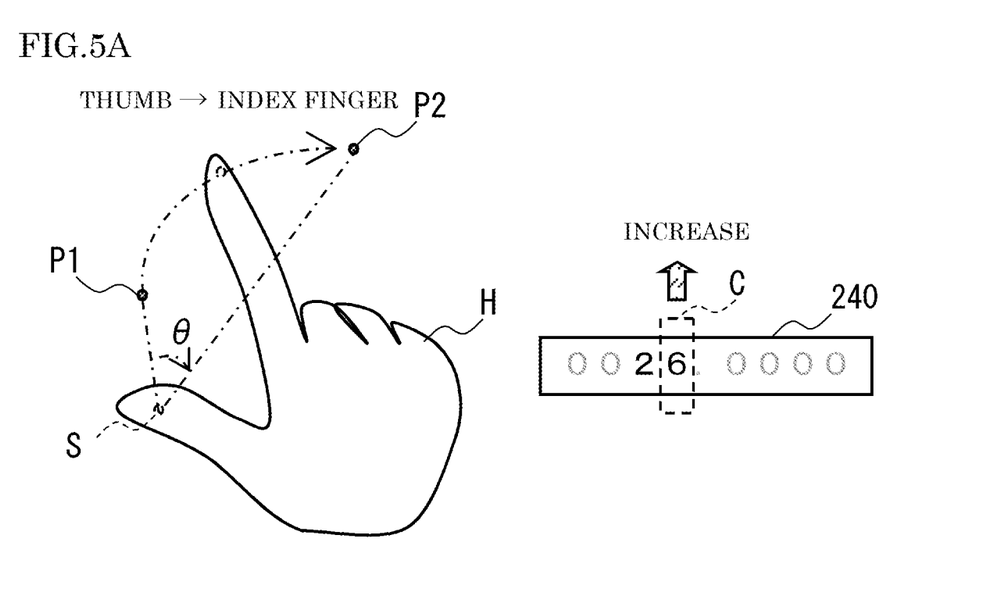
FIG. 5A is a conceptual diagram of counting in the numerical value counting process shown in FIG. 3.
Figure 5B:
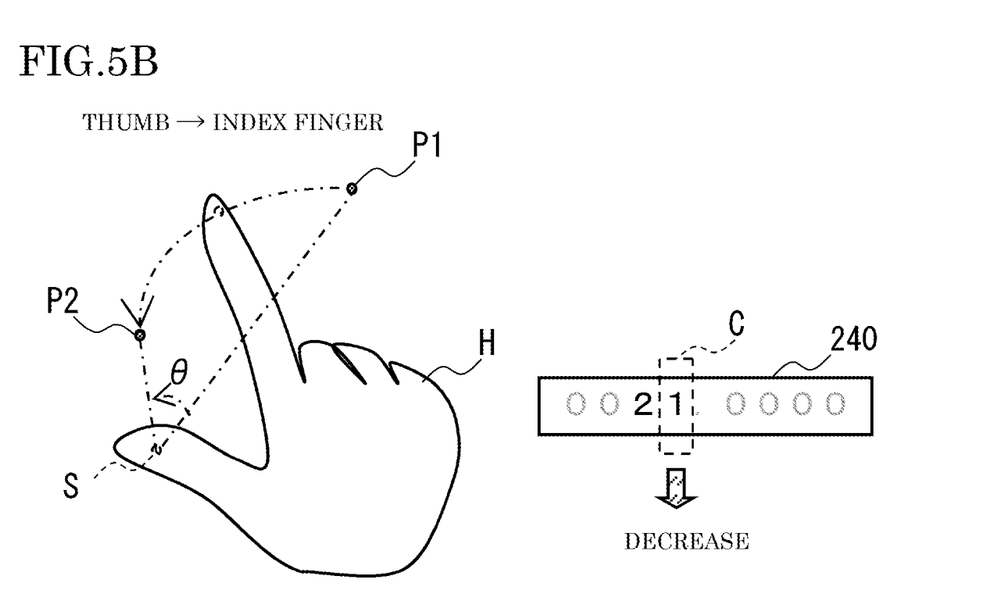
FIG. 5B is a conceptual diagram of counting in the numerical value counting process shown in FIG. 3.

FIG. 5 shows an example of calculating an angle of a rotation that was made after the thumb as the first finger then the index finger as the second finger was touched. That is, in this example, first, the thumb is touched to a lower portion of the touch panel, then the index finger is touched to an upper portion of the touch panel. The upper portion and the lower portion respectively correspond to the upper side at which the fingertips of a hand H of the user are located, and the lower side at which the wrist of the hand H is located in FIG. 5 to FIG. 7.

Specifically, in this example, the angle change calculating portion 100 calculates θ that is the angle change 200 when a touch coordinate of the index finger moves from a coordinate P1 to a coordinate P2 around a fulcrum S that is a touch coordinate of the thumb. FIG. 5A shows an example in which the index finger moves clockwise, namely, from left to right, and FIG. 5B shows an example in which the index finger moves counterclockwise, namely, from right to left. As indicated by this example, it is possible to calculate the angle between the coordinates P1 and P2 even if the trace of the movement of the index finger does not draw an arc.

(Step S104)

Subsequently, the numerical value counting portion 130 performs a count integer decimal setting process.

A setting is made so that the numerical value counting portion 130 counts an integer digit of the input numerical value 240 when the first finger and the second finger are touched in the stated order. In the present embodiment, a setting is made so that the numerical value counting portion 130 counts a digit C of the ones place of the integer digits when the thumb is touched to the touch panel, then the index finger is touched to the touch panel, and the index finger is rotated.

On the contrary, a setting is made so that the numerical value counting portion 130 counts a decimal digit of the input numerical value 240 when the second finger and the first finger are touched in the stated order. In the present embodiment, a setting is made so that the numerical value counting portion 130 counts a digit C of the tenth place (the first decimal place) of the decimal digits when the thumb and the index finger are touched in the stated order.

Here, the numerical value of what digit in the integer digits and the decimal digits is counted up or down is changed in a digit change process that is described below. In addition, a setting may be made so that an integer digit is counted when the first finger and the second finger are touched almost simultaneously.

(Step S105)

Subsequently, the change speed calculating portion 110 performs a change speed calculation process.

The change speed calculating portion 110 calculates the change speed 210 of the angle change 200. The change speed calculating portion 110 calculates, as the angle change 200, a difference between an angle calculated last time and an angle calculated this time. Alternatively, the change speed calculating portion 110 may calculate, as the change speed 210 of the angle change 200, an acceleration, not a mere speed, or an average value of angle changes 200 of a plurality of times.

(Step S106)

Subsequently, the numerical value counting portion 130 determines whether or not a rotation has been made at a speed higher than a predetermined threshold.

When the change speed 210 is higher than the predetermined threshold, the numerical value counting portion 130 determines as Yes. The predetermined threshold may be set to a speed, such as $0.5\pi$(radian) to $1.0\pi$ (radian)/1 second or more, from which an intention of the user of quickly rotating can be assumed. Otherwise, the numerical value counting portion 130 determines as No. Upon determining as Yes, the numerical value counting portion 130 moves the process to step S107. Upon determining as No, the numerical value counting portion 130 moves the process to step S108.

(Step S107)

Upon determining that a rotation has been made at a speed higher than the predetermined threshold, the numerical value counting portion 130 performs an inertia count addition process.

The numerical value counting portion 130 sets the continuous inertia value 230 to a value corresponding to the change speed 210. Here, a count width when the count is continued by "inertia" is set to the continuous inertia value 230.

As described below, when the continuous inertia value 230 has been set, even if the second finger is separated from the touch panel, the count by the numerical value counting portion 130 is continued.

This allows the GUI to create an impression that, in a state where a count of the input numerical value 240 is being made, when the finger is quickly rotated and then is separated immediately before the count is stopped, the count appears to be continued as if the "inertia" is applied.

(Step S108)

Here, the distance calculating portion 120 performs a distance calculation process.

The distance calculating portion 120 calculates the interfinger distance 220 between the first finger and the second finger.

Figure 6A:
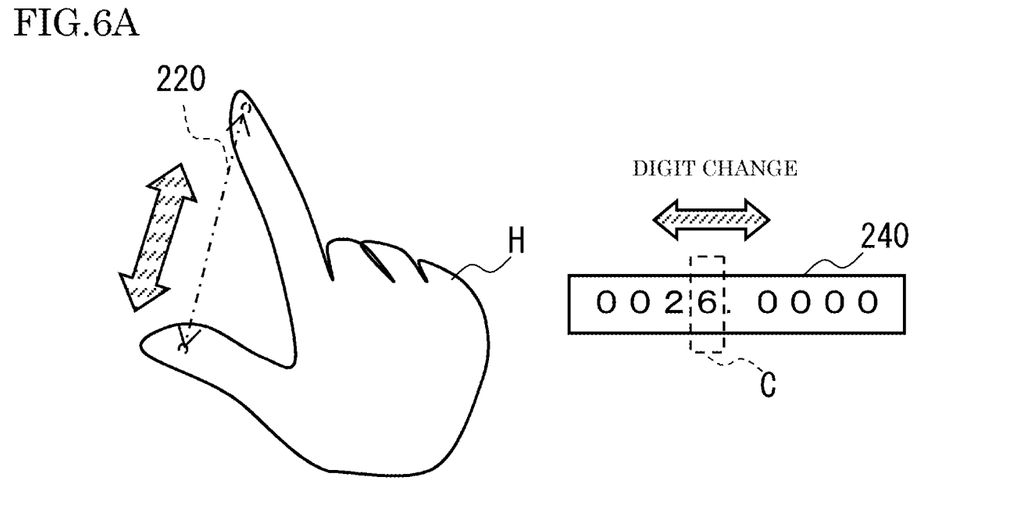
FIG. 6A is a conceptual diagram of a digit change in the numerical value counting process shown in FIG. 3.

FIG. 6A shows an example in which the interfinger distance 220 is calculated. In this example, a distance between touch coordinates when a general pinch-in or pinch-out is performed is calculated as the interfinger distance 220. In this case, when the above-described rotation has been performed immediately before, the distance calculating portion 120 does not need to calculate the interfinger distance 220.

(Step S109)

Subsequently, the numerical value counting portion 130 determines whether or not a digit change condition has been satisfied.

The numerical value counting portion 130 determines as Yes when a change of the interfinger distance 220 that is described below has exceeded a threshold for the digit change. The numerical value counting portion 130 also determines as Yes when it has detected that the first finger and the second finger have moved in a vertical direction. The numerical value counting portion 130 also determines as Yes when three or more fingers have been touched to the touch panel, namely, when touches have been made at three or more coordinates. That is, when any one of these has been detected, the numerical value counting portion 130 determines that the digit change condition has been satisfied. Otherwise, the numerical value counting portion 130 determines as No. Upon determining as Yes, the numerical value counting portion 130 moves the process to step S110.

Upon determining as No, the numerical value counting portion 130 moves the process to step S112.

(Step S110)

Upon determining that the digit change condition has been satisfied, the numerical value counting portion 130 performs a digit change process.

FIG. 6A shows a case where, when a change of the interfinger distance 220 exceeds a threshold for the digit change, the numerical value counting portion 130 changes the digit C to be counted, in response to the interfinger distance 220 calculated by the distance calculating portion 120.

Specifically, when the user touches the first finger and the second finger to the touch panel and spreads the fingers, the numerical value counting portion 130 changes the digit C to be counted, to higher (left) places such as the tens place, the hundreds place, the thousands place and so on.

On the contrary, when the user touches the first finger and the second finger to the touch panel and narrows the fingers, the numerical value counting portion 130 changes the digit C to be counted, to lower (right) places such as the first decimal place, the second decimal place, the third decimal place, the fourth decimal place and so on.

Subsequently, when the user rotates a finger, the numerical value counting portion 130 may count the digit C in a numerical value counting process that is described below. In this case, during the count, when the user changes the interfinger distance 220 by pinch-in or pinch-out, the numerical value counting portion 130 may count the digit C while changing the digit C in a left-right direction.

Figure 6B:
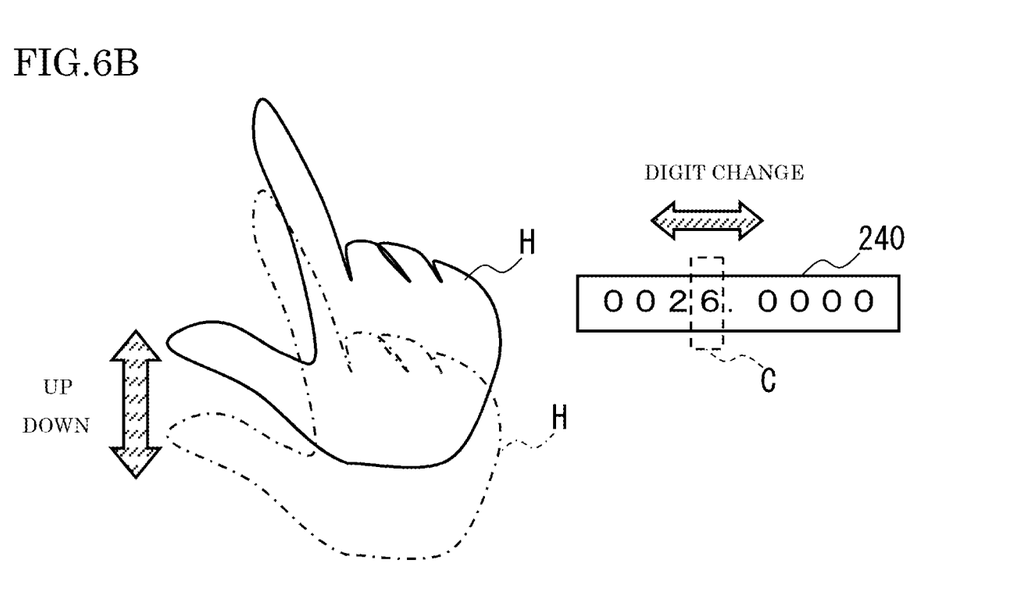
FIG. 6B is a conceptual diagram of a digit change in the numerical value counting process shown in FIG. 3.

FIG. 6B shows a case where when a vertical movement of the first finger and the second finger is detected, the digit C to be counted is changed in response to the distance between coordinates that have moved in this movement.

That is, when the user touches the first finger and the second finger to the touch panel and moves both fingers upward, the numerical value counting portion 130 may move the digit C to be counted to higher places. Subsequently, when the user rotates a finger, the digit C may be counted.

On the contrary, when the user touches the first finger and the second finger to the touch panel and moves both fingers downward, the numerical value counting portion 130 may move the digit C to be counted to lower places. Subsequently, when the user rotates a finger, the decimal digit may be counted.

Similar to the example shown in FIG. 5A, during the count, when the user changes the positions of both fingers, the numerical value counting portion 130 may count the digit C while changing the digit C in the left-right direction.

Figure 7A:
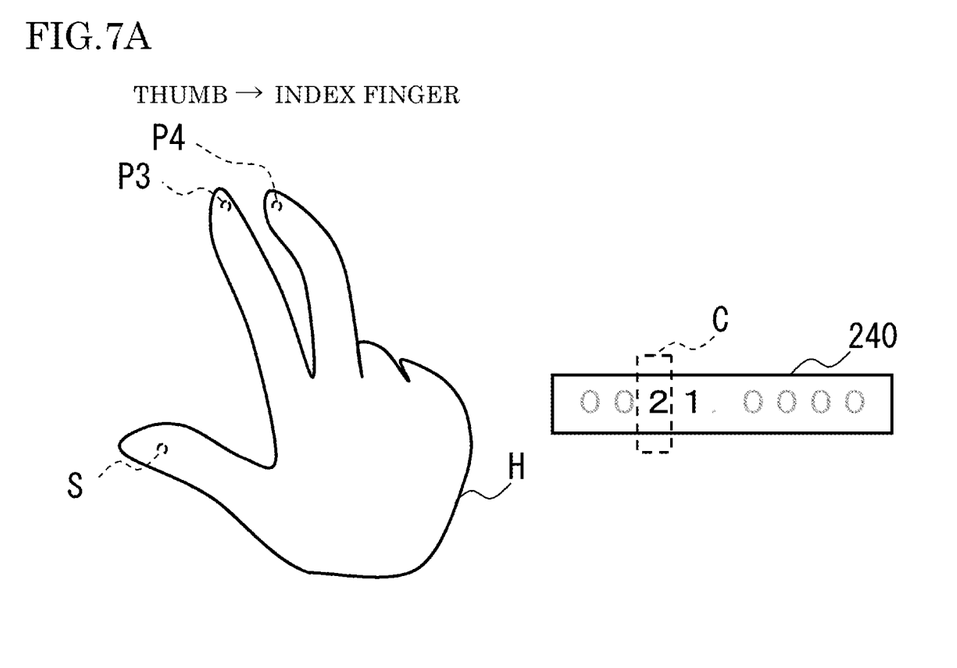
FIG. 7A is a conceptual diagram of a digit change in the numerical value counting process shown in FIG. 3.
Figure 7B:
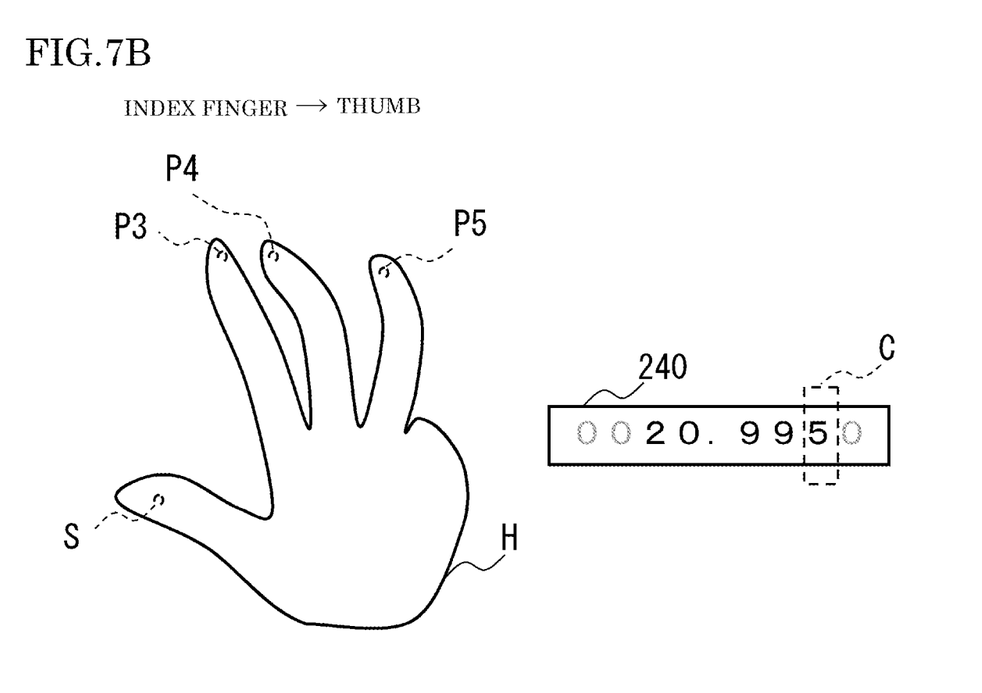
FIG. 7B is a conceptual diagram of a digit change in the numerical value counting process shown in FIG. 3.

FIG. 7 shows a case where the numerical value counting portion 130 changes the digit C to be counted in response to the number of fingers touched to the touch panel.

Specifically, for example, when there are three or more touched coordinates, the numerical value counting portion 130 changes the digit C to be counted in response to the setting of counting an integer digit or a decimal digit set in the above-described count integer decimal setting process.

As described above, FIG. 7A shows an example in which an integer digit is counted. In this case, each time the number of touched fingers is increased, the numerical value counting portion 130 changes the place of integer digit to be counted leftward. Specifically, when it is detected that the fulcrum S of the first finger is touched to the touch panel, and then it is detected that the coordinate P3 of the second finger and the coordinate P4 of the third finger are touched on the touch panel, the digit C is set to the tens place of the integer digits. That is, when the user rotates the second finger and/or the third finger in this state, the numerical value counting portion 130 counts up or down the numerical value at the tens place digit.

On the contrary, FIG. 7B shows an example in which a decimal digit is counted. In this case, each time the number of touched fingers is increased, the numerical value counting portion 130 changes the place of decimal digit to be counted rightward. Specifically, when it is detected that the coordinate P3 of the second finger is touched to the touch panel, then it is detected that the fulcrum S of the first finger is touched to the touch panel, and then it is detected that the coordinate P4 of the third finger and the coordinate P5 of the fourth finger are touched on the touch panel, the digit C is set to the third decimal place of the decimal digits. That is, when the user rotates any of or an arbitrary combination of the second finger, the third finger, and the fourth finger in this state, the numerical value counting portion 130 counts up or down the numerical value of the digit C at the third decimal place. Thereafter, the numerical value counting portion 130 moves the process to step S112.

(Step S111)

When less than two fingers are touched, the numerical value counting portion 130 performs an inertial count speed-down process.

When the count is continued even when the second finger is separated from the touch panel, the numerical value counting portion 130 decreases the continuous inertia value 230 at a constant rate. This makes it possible to speed down the count gradually.

That is, it is possible to create an impression that, in a state where the count appears to be continued by the inertia, the count speed is gradually deceased and the count stops as if the dynamic friction coefficient or the like is applied.

(Step S112)

Here, the numerical value counting portion 130 performs a numerical value counting process.

The numerical value counting portion 130 counts the input numerical value 240 input to the numerical value input field 300, in response to the angle change 200.

In the present embodiment, for example, as shown in the examples of FIG. 5 to FIG. 7, when the first finger and the second finger are touched and rotated rightward, the numerical value counting portion 130 counts up the numerical value of the digit C in the input numerical value 240 of the numerical value input field 300. When the first finger and the second finger are touched and rotated leftward, the numerical value counting portion 130 counts down the numerical value of the digit C in the input numerical value 240 of the numerical value input field 300. That is, in the present embodiment, in response to θ that is a calculated angle change 200, a count-up is performed when the index finger is moved from left to right, and a count-down is performed when the index finger is moved from right to left.

Furthermore, the numerical value counting portion 130 performs the count-up or the count-down by calculating a count width corresponding to the change speed 210. The count width indicates the unit of numerical value counted in the numerical value input field 300, or a speed of an animation. That is, as the count width increases, the width of the numerical value that is counted up or down in unit of one frame increases, and the count-up or the count-down becomes faster. On the contrary, as the count width decreases, the width of the numerical value that is counted up or down in unit of one frame decreases, and the count-up or the count-down becomes slower.

Here, as described above, the numerical value counting portion 130 may increase the count width when the rotation speed of the second finger is increased. On the other hand, the numerical value counting portion 130 may decrease the count width when the rotation speed of the second finger is decreased. It is also possible to change the digit to be counted, or continue the count by "inertia".

The count-up or the count-down of the input numerical value 240 is reflected on the numerical value input field 300 displayed on the display portion 21 by the GUI. This allows the user to input a numerical value intuitively by imaging rotating a dial.

When the count-up or the count-down is performed, carry processing or borrow processing may be performed.

It is noted that the numerical value counting portion 130 may perform the count-up or the count-down upon detection of pressing of an up button or a down button of the numerical value input field 300.

(Step S113)

Subsequently, the numerical value counting portion 130 determines whether or not all fingers have been separated.

The numerical value counting portion 130 determines as Yes when no touch coordinate is detected on the touch panel of the input portion 20. In addition, the numerical value counting portion 130 determines as Yes when "OK" button or "Cancel" button or when "Close (x)" button is pressed in the numerical value input field 300. Otherwise, the numerical value counting portion 130 determines as No.

Upon determining as Yes, the numerical value counting portion 130 ends the numerical value counting process of the present embodiment. This allows the input numerical value 240 of the numerical value input field 300 stored in the storage portion 19 to be established.

Upon determining as No, the numerical value counting portion 130 returns the process to step S100, and continues the counting process. This ends the numerical value counting process of the present embodiment.

The above-described configuration produces the following effects.

Conventionally, there is known a technique for counting up or down a numerical value with a "+" button or a "−" button provided in a dialog for a numerical value input via the GUI. However, with the technique, a numerical value cannot be input intuitively since it takes time to input the numerical value.

On the other hand, PTL (patent literature) 1 discloses a technique for feeding pages based on the number of fingers placed on the touch panel and a flicking speed. However, with the technique of PTL 1, too, it takes time to input to feed a large number of pages, and the operability is not good enough to input a specific numeric value. Thus, it is not possible to input a numerical value intuitively in the numerical value input field 300 or the like.

On the other hand, the image forming apparatus 1 according to an embodiment of the present invention is characterized to include: a touch panel of an input portion 20 configured to detect touches of a plurality of fingers; an angle change calculating portion 100 configured to, when it is detected that a first finger and a second finger have been touched to the touch panel, calculate an angle change 200 of the second finger with the first finger as a fulcrum; and a numerical value counting portion 130 configured to count an input numerical value 240 that is input, in response to the angle change 200 calculated by the angle change calculating portion 100.

With the above-described configuration, it is possible to input a numerical value by counting it with an intuitive operation, namely a gesture operation "rotation", while feeling as if rotating a dial. As a result, the time taken to input the numerical value is reduced, and it is possible to improve the usability of the user. That is, it is possible to perform the count-up and the count-down speedily and intuitively.

Conventionally, there is also known a technique for directly inputting a numerical value by using software or hardware numeric keys. However, this requires a space for displaying software numeric keys, or a cost for preparing hardware numeric keys.

On the other hand, according to the image forming apparatus 1 of an embodiment of the present invention, a gesture operation "rotation" is performed on the touch panel of the input portion 20. As a result, there is no need for the space for the software numeric keys or the hardware numeric keys, thereby reducing the cost.

The image forming apparatus 1 according to an embodiment of the present invention is characterized to further include: a change speed calculating portion 110 configured to calculate a change speed 210 of the angle change 200, wherein the numerical value counting portion 130 changes a count width of a change of the input numerical value 240 in response to the change speed 210 calculated by the change speed calculating portion 110.

With the above-described configuration, it is possible to change the speed of the count-up and the count-down by the speed of the finger, thereby making it possible to input a numerical value intuitively.

The image forming apparatus 1 according to an embodiment of the present invention is characterized in that in a case where the change speed 210 is faster than a predetermined threshold, the numerical value counting portion 130 continues the count even if the second finger is separated from the touch panel.

With the above-described configuration, it is possible to improve the operability of the user by counting with "inertia", thereby making it possible to input a numerical value by counting it with an intuitive operation.

The image forming apparatus 1 according to an embodiment of the present invention is characterized in that in a case where the count is continued even when the second finger is separated from the touch panel, the numerical value counting portion 130 gradually slows down the count and/or stops the count when a touch on the touch panel is detected again.

With the above-described configuration, it is possible to adjust the level of the "inertia", thereby making it possible to input a numerical value as intended by the user.

According to the conventional technique for counting up or down a numerical value with a "+" button or a "−" button, the larger the width of the numerical value to be input is, the more time is taken to input. In addition, it takes much time to input a number at a decimal place.

On the other hand, the image forming apparatus 1 according to an embodiment of the present invention is characterized in that the numerical value counting portion 130 changes a digit C to be counted, in response to the number of fingers touched to the touch panel.

With the above-described configuration, it is possible to change the digit to be counted up or down, in response to the number of fingers. This allows the user to reduce the input time regardless of the width or the value of the input numerical value.

The image forming apparatus 1 according to an embodiment of the present invention is characterized in that in a case where fingers were touched in order from the first finger to the second finger, the numerical value counting portion 130 counts an integer digit C of the input numerical value 240, and in a case where fingers were touched in order from the second finger to the first finger, the numerical value counting portion 130 counts a decimal digit C of the input numerical value 240.

With the above-described configuration, it is possible to select, with an easy operation, which of an integer digit or a decimal digit to count, thereby making it possible to input a numerical value as intended by the user. That is, the user can change the numerical value of an integer digit or a decimal digit speedily.

The image forming apparatus 1 according to an embodiment of the present invention is characterized in that the numerical value counting portion 130 changes a digit C to be counted, in correspondence with moving up and down of the first finger and the second finger.

With the above-described configuration, it is possible to change a digit to be counted up or down, by moving the touched fingers simultaneously. This makes it possible to reduce the input time.

The image forming apparatus 1 according to an embodiment of the present invention is characterized to further include: a distance calculating portion 120 configured to calculate an interfinger distance 220 between the first finger and the second finger, wherein the numerical value counting portion 130 changes the digit C to be counted, in response to the interfinger distance 220 calculated by the distance calculating portion 120.

With the above-described configuration, it is possible to change a digit to be counted up or down, by changing the distance between the fingers. This makes it possible to reduce the input time.

OTHER EMBODIMENTS

It is noted that in the above-described embodiment, the position on the touch panel of the input portion 20 at which the user should touch is not specified in p articular.

However, it may be configured to detect a touch by the user of the numerical value input field 300 of the GUI or pinching of the numerical value input field 300.

With the above-described configuration, it is possible to indicate the numerical value input field 300 in which the input numerical value 240 is input.

On the contrary, the position at which a gesture should be performed by touching may not be the numerical value input field 300. Furthermore, the touch panel of the input portion 20 may not be integrally provided with the display portion 21. In this case, too, it is possible to perform a gesture operation "rotation" of the present embodiment by using a touch pad or the like.

The above-described embodiment provides an example where the index finger is moved like a rotation with the thumb as a fulcrum.

However, the "rotation" may be performed by using the index finger, the ring finger, or the little finger as the first finger, and moving any one of the other fingers including the thumb as the second finger like a rotation. Furthermore, a touch device such as a plurality of pens, a touch device having a fulcrum such as a compass, a dial-like device may be used. Alternatively, a fulcrum may not be set, but the first finger and the second finger may be turned as if a dial is actually rotated, and this may be detected as the "rotation".

With the above-described configuration, it is possible to input a numerical value intuitively in various configurations.

The above-described embodiment provides an example where the numerical value input field 300 is a dialog box.

However, the numerical value input field 300 may be a numerical value input space in a form, a space for inputting a page number or a numerical value to be set, or a space for inputting other types of numerical values.

With the above-described configuration, it is possible to apply the numerical value counting method of the present embodiment to a field in which various types of numerical values are input directly.

In addition, the present invention is applicable to information processing apparatuses other than the image forming apparatus. For example, the present invention is applicable to a configuration that uses a network scanner, or a configuration that uses a server to which a scanner is connected via USB or the like. Furthermore, the present invention is applicable to an electronic book browsing terminal, a mobile telephone, a tablet, or other information processing apparatuses.

The configurations and operations of the above-described embodiments are provided as examples, and it is to be understood that they can be changed as appropriate and implemented without deviating from the gist of the present invention.

The invention claimed is:

1. An image forming apparatus comprising:
a touch panel configured to detect touches of a plurality of fingers and display a graphical user interface including a numerical value input field; and
a processor configured to:
when it is detected that a first finger and a second finger have been touched to the touch panel, calculate an angle change of the second finger with the first finger as a fulcrum; and count a numerical value that is input to the numerical value input field, in response to the angle change,
wherein the angle change is a value indicating a change of an angle of a rotation of the second finger with the first finger as a fulcrum,
the processor changes a digit to be counted, in response to a number of fingers touched to the touch panel,
in a case where the fingers were touched in order from the first finger as the fulcrum to the second finger that is rotated, the processor counts an integer digit of the numerical value, and
in a case where the fingers were touched in order from the second finger that is rotated to the first finger as the fulcrum, the processor counts a decimal digit of the numerical value.

2. The image forming apparatus according to claim 1, wherein
the processor is further configured to calculate a change speed of the angle change, and
the processor changes a count width of a change of the numerical value in response to the change speed.

3. The image forming apparatus according to claim 2, wherein
in a case where the change speed is faster than a predetermined threshold, the processor continues the count even if the second finger is separated from the touch panel.

4. The image forming apparatus according to claim 3, wherein
in a case where the count is continued even when the second finger is separated from the touch panel, the processor gradually slows down the count and/or stops the count when a touch on the touch panel is detected again.

5. The image forming apparatus according to claim 1, wherein
the processor changes a digit to be counted, in correspondence with moving up and down of the first finger and the second finger.

6. The image forming apparatus according to claim 1, wherein
the processor is further configured to calculate an interfinger distance between the first finger and the second finger, and
the processor changes a digit to be counted, in response to the interfinger distance.

* * * * *